United States Patent Office 3,017,400
Patented Jan. 16, 1962

3,017,400
POLYMERIZATION OF OLEFINS
Herman S. Bloch, Skokie, Ill., assignor, by mesne assignments, to Universal Oil Products Company, Des Plaines, Ill., a corporation of Delaware
No Drawing. Filed Nov. 2, 1956, Ser. No. 619,929
3 Claims. (Cl. 260—94.9)

This invention relates to a process for the polymerization of unsaturated compounds and more particularly to a novel method for initiating the polymerization of unsaturated hydrocarbons, such as olefins and dienes.

It is an object of this invention to provide a method for polymerizing unsaturated organic compounds.

A further object of this invention is to provide a novel method for initiating the polymerization of olefins and dienes.

One embodiment of this invention is found in a process for the polymerization of unsaturated compounds by initiating said polymerization by addition of an olefin derivative selected from the group consisting of olefin oxides, olefin imines and olefin sulfides in the presence of a carbonium ion inducing catalyst, and recovering the resultant polymerized unsaturated compound.

Another embodiment of this invention resides in a process for the polymerization of unsaturated compounds which comprises initiating said polymerization by the addition of an olefin derivative selected from the group consisting of olefin oxides, olefin imines and olefin sulfides in an amount of from about 0.01 to about 10% by weight of the unsaturated compound in the presence of a carbonium ion inducing catalyst, said polymerization being effected at a temperature in the range of from about 0° to about 300° C. and at a pressure in the range of from about 1 to about 350 atmospheres and recovering the resultant polymerized unsaturated compound.

A specific embodiment of the invention is found in a process for the polymerization of ethylene which comprises initiating said polymerization by the addition of ethylene oxide in an amount of from about 0.01 to about 10% by weight of the ethylene in the presence of an aluminum chloride catalyst, said polymerization being effected at a temperature in the range of from about 0° to about 300° C. and at a pressure in the range of from about 1 to about 350 atmospheres, and recovering the resultant polymerized ethylene.

Other objects and embodiments referring to alternative unsaturated compounds, alternative olefin oxides, imines and sulfides and carbonium ion inducing catalysts will be found in the following further detailed description of the invention.

The polymerization of unsaturated organic compounds such as olefins and dienes is an important process in the chemical and allied industries. For example, many unsaturated compounds can be polymerized and the resulting long-chain compounds used for plastics or resins, examples of such plastics being polyethylene or polystyrene. In addition, normally gaseous olefins such as propylene or butylenes may be polymerized to form polymers thereof which will enhance the octane ratings of gasoline. As hereinbefore stated this invention concerns a new process for making macromolecular polymers from olefins and dienes by initiating the reaction by including a relatively small amount of an olefin derivative such as an olefin oxide, olefin imine or olefin sulfide along with the unsaturated hydrocarbon which is to be polymerized. When low concentrations of these polymerization inducing compounds are used the carbonium ions which are initially formed will induce the polymerization of the olefins and dienes as a chain-carrying reaction, thus allowing the use of a relatively smaller amount of catalyst. Examples of compounds which initiate the polymerization of the unsaturated hydrocarbons include ethylene oxide, ethylene imine, ethylene sulfide, propylene oxide, propylene imine, propylene sulfide, butylene-1-oxide, butylene-1-imine, butylene-1-sulfide, butylene-2-oxide, butylene-2-imine, butylene-2-sulfide, isobutylene oxide, isobutylene imine, isobutylene sulfide, styrene oxide, butadiene mono-and di-oxide, cyclohexene oxide, vinylcyclohexene mono-oxide, etc. These olefin derivatives may be present in an amount of from about 0.01% to about 10% by weight of the unsaturated hydrocarbons to be polymerized, and preferably in an amount of from about 0.01% to about 1%. The polymerization of the aforementioned compounds takes place at a temperature in the range of from about 0° to about 300° C. and at a pressure in the range of from about 1 to about 350 atmospheres.

In addition, the initiation of the polymerization reaction takes place in the presence of a carbonium ion inducing catalyst. Examples of the aforesaid catalysts include acidic substances such as inorganic acids including hydrofluoric acid, hydrochloric acid, sulfuric acid, the phosphoric acids, etc.; relatively strong organic acids including benzene sulphonic acid, toluene sulphonic acid, sulfonated polystyrenes (i.e., the so-called ion-exchange resins) etc. In addition, Friedel-Crafts type catalysts including aluminum chloride, aluminum bromide, ferric chloride, zinc chloride, zirconium chloride, boron fluoride, etc., may be used. Other inorganic acidic oxides such as acid-acting clays, earths, and synthetic composites such as silica-alumina may also be used. Generally only about 1 to about 120% by weight of such catalysts, based on the initiating olefin derivative used, is sufficient.

Examples of unsaturated compounds which may be polymerized according to the process of this invention include such unsaturated hydrocarbons as olefins and dienes, examples of which include ethylene, propylene, butylene-1, butylene-2, isobutylene, amylene-1, amylene-2, isoamylenes, etc., butadiene, isoprene, pentadiene-1,3, pentadiene-1,4, styrene, vinyltoluenes, indene, and the like. It is also contemplated within the scope of this invention that mixtures of the above mentioned olefins and dienes may be polymerized according to the present process. Non-hydrocarbon monomers, such as, for example, the vinyl halides, vinyl esters, acrylates, and the like, may also be polymerized by the present process.

The process of this invention may be effected in any suitable manner and may comprise either a batch or a continuous type operation. For example, when a batch type operation is used a quantity of the polymerization inducing compound, that is, the olefin derivative such as the olefin oxide, imine or sulfide along with the unsaturated hydrocarbon to be polymerized may be placed in an appropriate apparatus. The particular catalyst chosen is then charged thereto, if in gaseous form, or otherwise placed therein, if in a liquid form. The apparatus is heated to the desired temperature and maintained thereat for a predetermined period of time while under a pressure in the aforementioned range. At the end of this time the flask and contents thereof are cooled to room temperature, the excess pressure vented, and the polymerization products are separated from any unreacted starting materials by conventional means such as fractional precipitation, distillation, etc.

Another method of polymerizing the unsaturated hydrocarbons according to this invention comprises a continuous type operation. In this operation the unsaturated hydrocarbons to be polymerized are continuously charged to a reaction zone which is maintained at the proper operating conditions of temperature and pressure. The polymerization inducing olefin derivative is also continuously charged through separate means or, if so desired, may be admixed with the unsaturated hydrocarbon prior to introduction into the vessel and the two charged thereto in a single line. The reaction zone may comprise an unpacked vessel or coil, or may be lined with an absorbent packing material such as fire brick, dehydrated bauxite, alumina and the like. The carbonium inducing catalyst is preferably separately introduced into the reactor or into the stream of olefin hydrocarbon and reaction initiator material; or if the catalyst is a solid, it may be disposed in the reactor vessel through which the reactants and initiator flow. Another type of operation which may be used with solid catalyst is the fluidized type in which the unsaturated compound and the suspended, finely divided catalyst are maintained in a state of turbulence under hindered settling conditions.

The reaction product, comprising the polymerized unsaturated hydrocarbons is continuously withdrawn, separated from the reactor effluent and purified by conventional means hereinbefore set forth, while the unreacted starting materials may be separated and recycled as a portion of the feed stock.

The following examples are given to illustrate the process of the present invention which, however, are not intended to limit the generally broad scope of the present invention in strict accordance therewith.

*Example I*

0.1 g. of powdered anhydrous aluminum chloride is placed in an autoclave which is provided with heating and stirring means. Ethylene is charged into said autoclave until a pressure of approximately 1000 p.s.i. has been reached, and the temperature is slowly raised to 75° C. while a mixture of ethylene (90%) and ethylene oxide (10%) is introduced until a total weight of 110 g. has been added to the autoclave. The autoclave and contents thereof are maintained at this temperature for a period of approximately one hour at the end of which time said autoclave and contents are cooled to room temperature. The reaction product, comprising waxy, semi-solid polyethylene, is recovered from the autoclave.

*Example II*

2.0 g. of hydrofluoric acid are placed in an autoclave provided with heating and stirring means. The vessel is sealed, and a stream of propylene containing 1% ethylene imine is charged thereto until approximately 250 g. has been charged thereto. The vessel and contents thereof are slowly heated to 85° C. and maintained at this temperature for a period of about ¾ hour at the end of which time the autoclave and contents thereof are allowed to return to room temperature. The excess pressure is vented and the reaction product washed with caustic and then with water to remove the catalyst components. The reaction product is separated and subjected to fractional distillation which shows it to be a series of polypropylenes containing some combined nitrogen.

*Example III*

1. g. of ethylene sulfide, comprising the polymerization initiating olefin derivative is placed in an autoclave which is provided with heating and stirring means and to which is added 84 g. of ethylene under pressure, the final pressure being 1200 p.s.i.g. Boron fluoride etherate (0.3 g.) is then added, and the temperature is gradually brought up to approximately 125° C. The autoclave and contents thereof are maintained at this temperature for a period of approximately one hour at the end of which time said autoclave and contents are cooled to room temperature. The excess ethylene is vented and the reaction product, comprising a semi-fluid, viscous polyethylene containing combined sulfur, is recovered.

*Example IV*

2.0 g. of hydrochloric acid and 2.0 g. of propylene oxide, comprising the catalyst and polymerization inducing olefin derivative, along with 100 g. of styrene are placed in a heavy-walled glass tube, air is swept out of the tube with nitrogen, after which the tube is sealed. The tube is then heated in an oil bath to a temperature of approximately 135° C. for one hour, said tube being shaken on an automatic shaking machine while continuing to be immersed in the oil bath. At the end of this time the tube and contents thereof are cooled to room temperature. The styrene is found to have polymerized to form polystyrene which contains some combined oxygen from the propylene oxide.

I claim as my invention:

1. A process for the polymerization of ethylene which comprises initiating said polymerization by the addition of ethylene oxide in an amount of from about 0.01 to about 10% by weight of the ethylene in the presence of an aluminum chloride catalyst, said ethylene oxide and said catalyst being separate chemically uncombined compounds and said polymerization being effected at a temperature in the range of from about 0° to about 300° C. and at a pressure in the range of from about 1 to about 350 atm., and recovering the resultant polymerized ethylene.

2. A process for the polymerization of ethylene which comprises initiating said polymerization by the addition of ethylene oxide in an amount of from about 0.01 to about 10% by weight of the ethylene in the presence of a boron fluoride catalyst, said ethylene oxide and said catalyst being separate chemically uncombined compounds and said polymerization being effected at a temperature in the range of from about 0° to about 300° C. and at a pressure in the range of from about 1 to about 350 atm., and recovering the resultant polymerized ethylene.

3. A process for the polymerization of a mono-olefinic hydrocarbon which comprises initiating said polymerization by the addition of an olefin oxide in an amount of from about 0.01 to about 10% by weight of said hydrocarbon in the presence of a catalyst selected from the group consisting of hydrochloric acid, hydrofluoric acid, aluminum chloride and boron trifluoride, said hydrocarbon and said catalyst being separate chemically uncombined compounds and said polymerization being effected at a temperature in the range of from about 0° to about 300° C. and at a pressure in the range of from about 1 to about 350 atm., and recovering the resultant polymerized hydrocarbon.

References Cited in the file of this patent

UNITED STATES PATENTS

| | | |
|---|---|---|
| 2,559,062 | Dornte | July 3, 1951 |
| 2,786,828 | Schneider et al. | Mar. 26, 1957 |

FOREIGN PATENTS

| | | |
|---|---|---|
| 308,755 | Great Britain | Oct. 7, 1929 |

OTHER REFERENCES

Zielinski et al.: Chem. Abs. 47, 10892i (1953) (abstracted from Przemysl chemiczny, vol. 31, No. 8 (1952), pages 471–2).

Schildknecht: "Polymer Processes," Interscience Publishers Inc., New York, February 1956, pages 201 and 204 relied upon.

Schildknecht: "Vinyl and Related Polymers," Wiley and Sons (New York, 1952), page 497.